United States Patent
Piesinger

(10) Patent No.: US 7,382,310 B1
(45) Date of Patent: Jun. 3, 2008

(54) METHOD FOR INDEPENDENTLY SETTING RANGE RESOLUTION, DOPPLER RESOLUTION, AND PROCESSING GAIN OF A PSEUDO-RANDOM CODED RADAR SYSTEM

(76) Inventor: Gregory Hubert Piesinger, 6225 E. Saguaro Vista Ct., Cave Creek, AZ (US) 85331

( * ) Notice: Subject to any disclaimer, the term of this patent is extended or adjusted under 35 U.S.C. 154(b) by 36 days.

(21) Appl. No.: 11/649,150

(22) Filed: Jan. 3, 2007

Related U.S. Application Data

(60) Provisional application No. 60/755,814, filed on Jan. 3, 2006.

(51) Int. Cl.
*G01S 13/62* (2006.01)
(52) U.S. Cl. .................. 342/28; 342/114; 342/134; 342/196; 340/541; 340/554
(58) Field of Classification Search ............. 342/27, 342/28, 99–101, 114–116, 131–137, 192, 342/196, 200–204; 340/541, 545.3, 554
See application file for complete search history.

(56) References Cited

U.S. PATENT DOCUMENTS

| | | | | |
|---|---|---|---|---|
| 4,952,939 | A * | 8/1990 | Seed ............................ | 342/27 |
| 5,903,654 | A * | 5/1999 | Milton et al. .......... | 342/357.02 |
| 6,058,139 | A * | 5/2000 | Horiguchi et al. .......... | 375/149 |
| 6,636,178 | B2 * | 10/2003 | Gronemeyer ............... | 342/378 |
| 2003/0081660 | A1 * | 5/2003 | King et al. ................. | 375/150 |
| 2003/0147457 | A1 * | 8/2003 | King et al. ................. | 375/148 |
| 2003/0222778 | A1 * | 12/2003 | Piesinger .................... | 340/541 |
| 2006/0053490 | A1 * | 3/2006 | Herz et al. .................... | 726/23 |

* cited by examiner

*Primary Examiner*—John B Sotomayor

(57) ABSTRACT

Methods are disclosed for independently setting the range resolution, Doppler resolution, and pulse compression processing gain of a Doppler radar system. Higher Doppler resolution is achieved by segmenting and spreading apart a pseudo-random code (PRC) to increase the processing dwell time on a target. Simultaneous high and low range resolution is obtained by interleaving a second segmented low resolution PRC into the time gaps between a first segmented high resolution PRC.

19 Claims, 7 Drawing Sheets

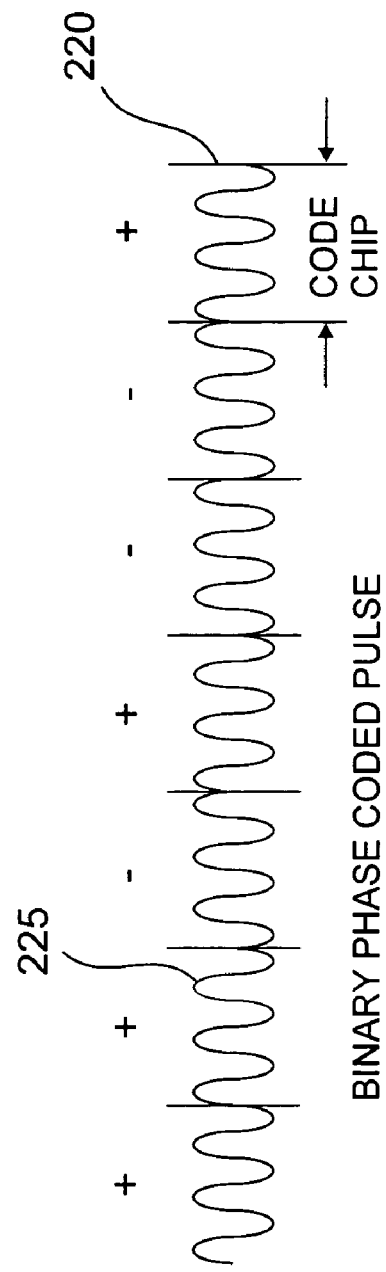
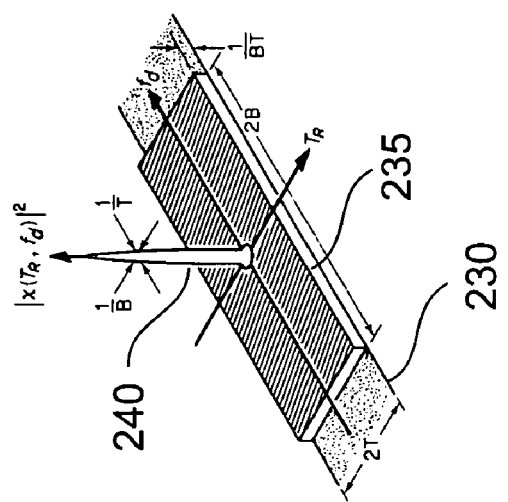
FIG. 1

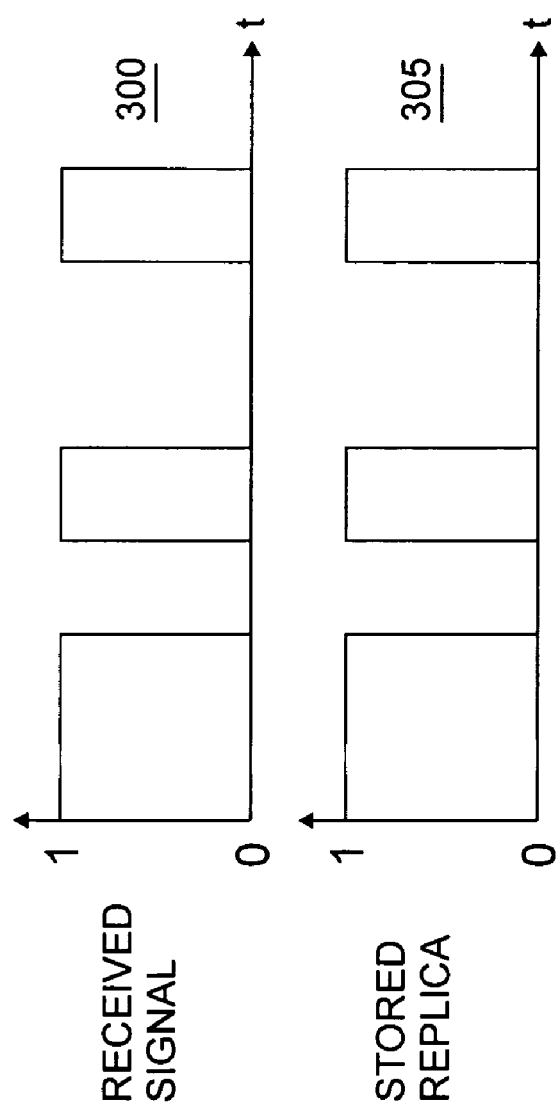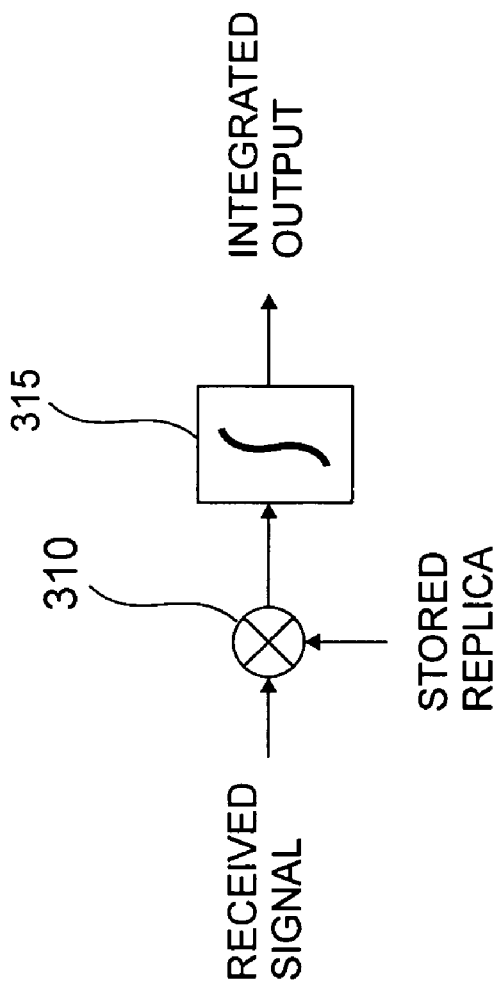
FIG. 4

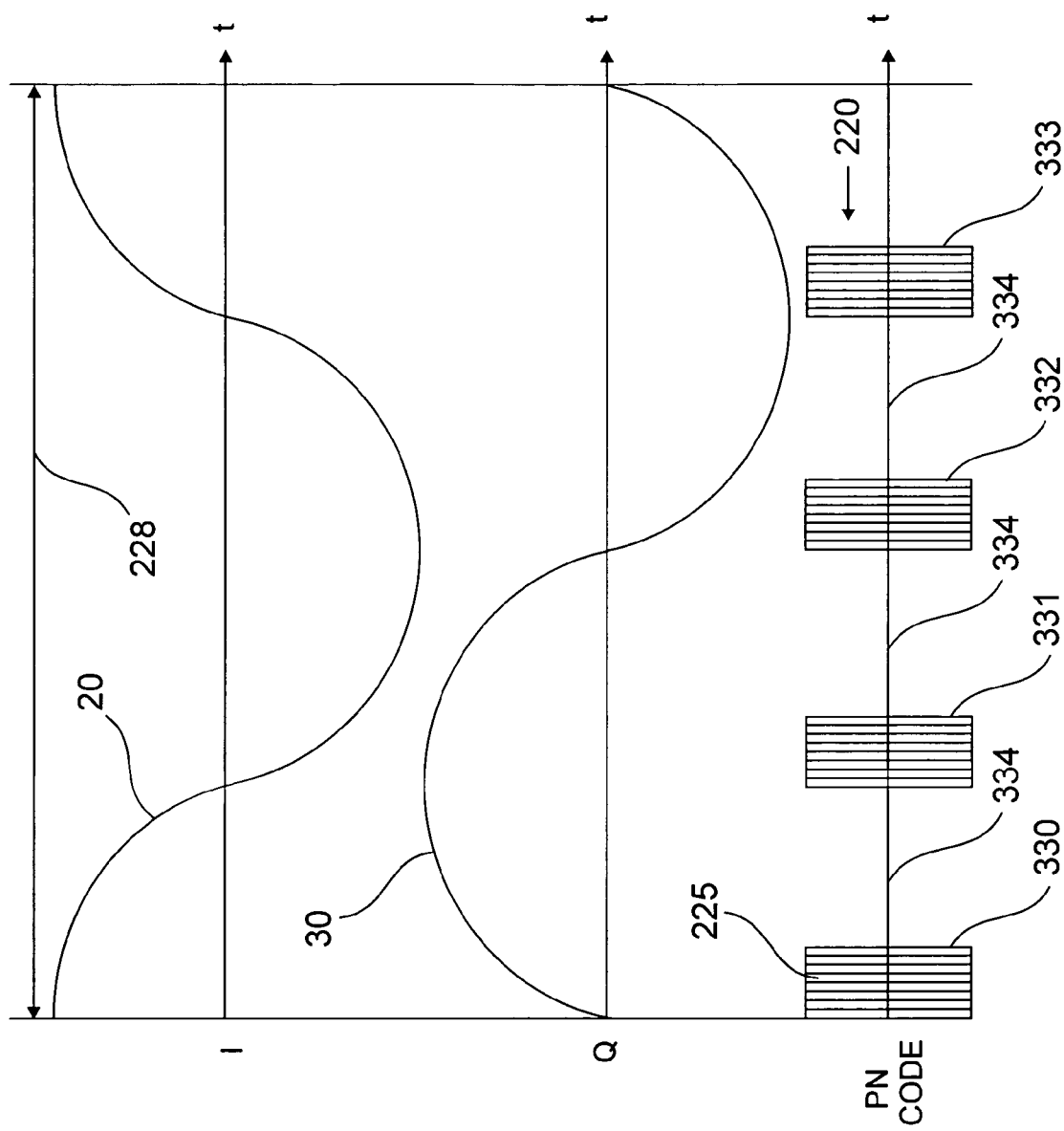

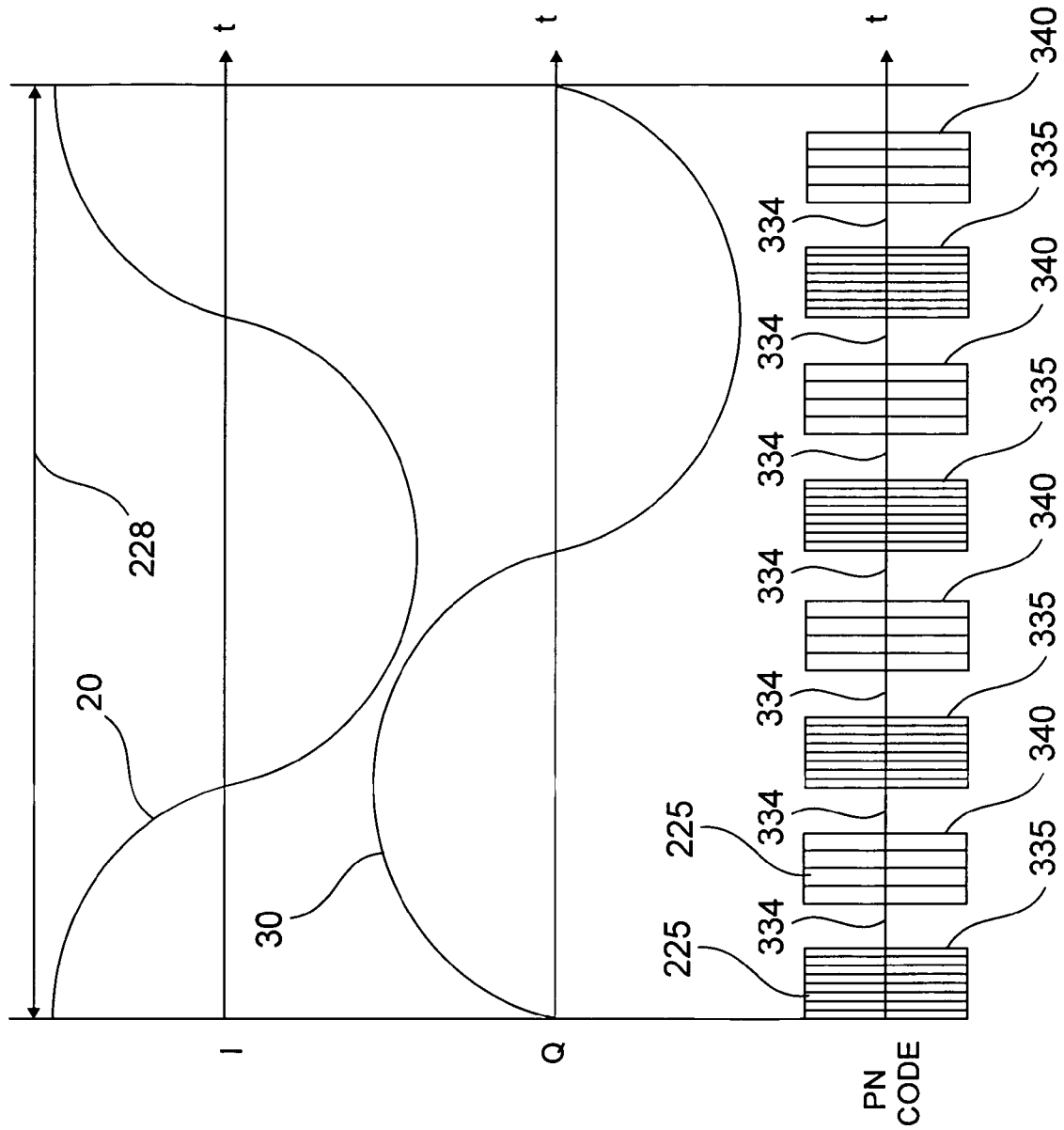

METHOD FOR INDEPENDENTLY SETTING RANGE RESOLUTION, DOPPLER RESOLUTION, AND PROCESSING GAIN OF A PSEUDO-RANDOM CODED RADAR SYSTEM

RELATED INVENTION

The present invention claims benefit under 35 U.S.C. 119(e) to "Method for Independently Setting Range Resolution, Doppler Resolution, and Processing Gain of a Pseudo Random Code Radar" U.S. Provisional Patent Application Ser. No. 60/755,814, filed 3 Jan. 2006, which is incorporated by reference herein.

TECHNICAL FIELD OF THE INVENTION

The present invention relates to the field of Doppler radar using pseudo-random coded radar signals.

BACKGROUND OF THE INVENTION

Doppler processing is used in many radar applications to detect the presence of moving targets. Specifically, a signal is transmitted by the radar transmitter, the transmitted signal is reflected by a moving target, the reflected signal is received by the radar receiver, and the Doppler frequency shift due to the movement of the target is detected by the radar signal processor.

To enhance the performance of a radar, pulse compression signals can be used to increase range resolution. Pulse compression allows a long transmit pulse reflected from a target to be time compressed in the radar signal processor, thus increasing the range resolution of the radar.

A popular pulse compression radar signal is one that uses a pseudo-random noise (PN) code to bi-phase modulate the radio frequency carrier of the transmitter. The radar characteristics of this type of signal are well known to radar engineers skilled in the art.

Although the present invention can be applied to many pulse compression radar applications, this disclosure will describe its application to the radar intrusion detection system disclosed in U.S. Pat. No. 6,922,145 "Intrusion Detection, Tracking, and Identification Method and Apparatus", which is incorporated herein by reference.

SUMMARY OF THE INVENTION

U.S. Pat. No. 6,922,145 described the use of a continuous wave (CW) PN coded transmit signal and matched filters tuned to various Doppler frequency offsets to achieve its performance goals. However, to obtain high Doppler resolution, either very high microwave frequencies or very long PN code sequences are used.

In accordance with the teaching of this invention, high Doppler resolution can be achieved by transmitting and receiving a short PN coded signal in segments spread out over a longer time period. This increases the processing dwell time on the target which increases the effective processing Doppler shift of the target and thus provides a higher Doppler resolution.

Transmitting and receiving the PN coded signal in segments allows the use of a high resolution PN coded signal to be time shared with a low resolution PN coded signal. That is, segments from a low resolution code can be interleaved with segments from a high resolution code. This creates a multi-mode radar with simultaneous high and low range resolution.

BRIEF DESCRIPTION OF THE DRAWINGS

FIG. 1 illustrates the waveform and ambiguity diagram for a binary phase coded pulse radar signal.

FIG. 4 illustrates a conceptual implementation of a matched filter.

FIG. 6 illustrates a short duration pulsed PN coded signal segmented into bursts that are spread out over the period of the demodulated baseband in-phase (I) and quadrature-phase (Q) signals that would be output by the radar receiver when receiving a CW unmodulated radar signal, from a Doppler shifted target.

FIG. 7 illustrates two segmented pulsed PN coded signals interleaved over the period of the demodulated baseband in-phase (I) and quadrature-phase (Q) signals that would be output by the radar receiver when receiving a CW unmodulated radar signal, from a Doppler shifted target.

DETAILED DESCRIPTION OF THE PREFERRED EMBODIMENTS

Figure 2:
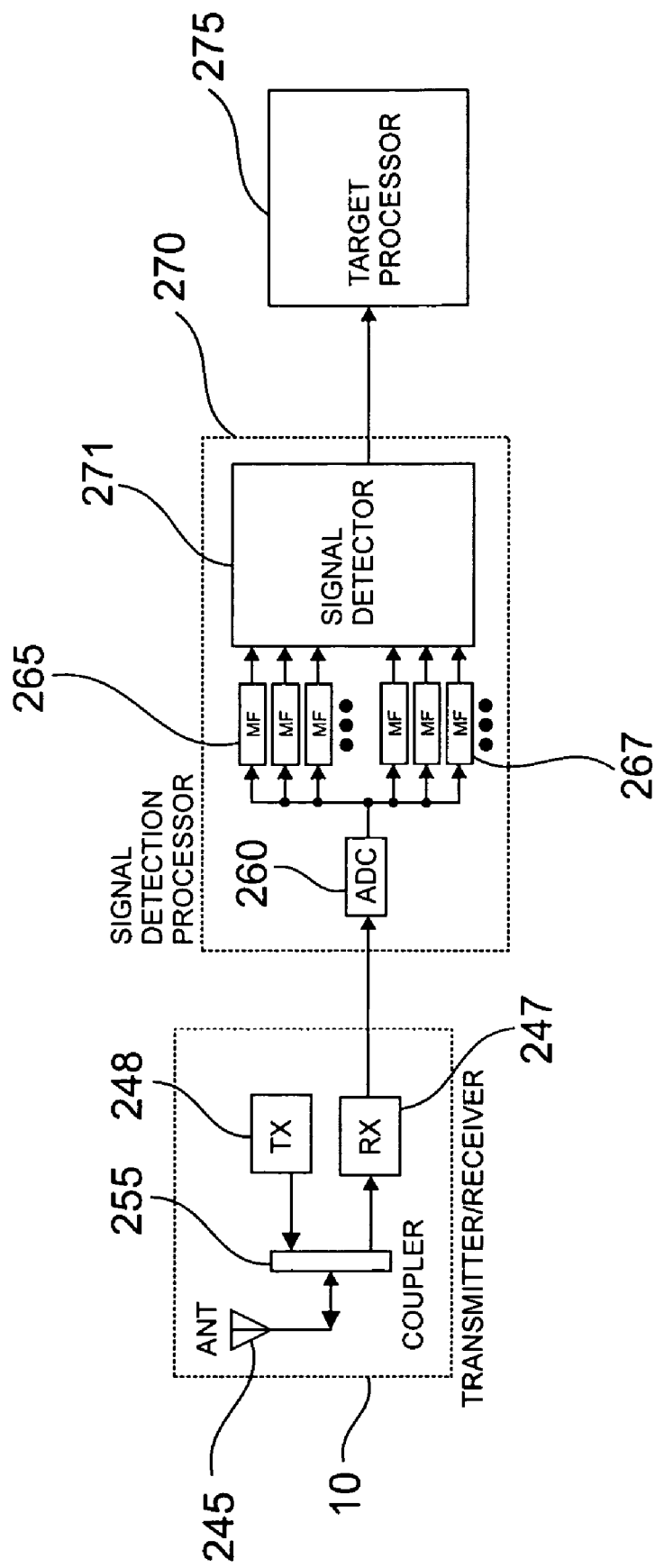
FIG. 2 illustrates a conceptual block diagram of a radar system using Doppler processing.

The below-discussed preferred embodiments of the present invention provide a method of independently selecting the range resolution, Doppler resolution, and processing gain of a PN coded radar system.

A short binary phase coded signal 220 containing 7 phase code chips 225 (N=7), with code sequence + + − +− − +, is illustrated in FIG. 1. An ambiguity function 230 is illustrated as a two dimensional footprint on a time and frequency diagram. The ambiguity function 230 for a long binary phase coded signal (N>100) approaches a thumbtack shape in which a broad plateau 235 surrounds the spike 240 at zero range time offset and zero Doppler frequency offset.

When a reflected phase coded signal from a stationary target is decoded and compressed by a matched filter in the receiver, an output pulse N times greater in power is obtained at the instant that represents the target range, where N is the number of binary phase coded chips 225 used in the phase coded signal 220. This pulse compression processing gain is typically expressed in decibels as given by 10 times the base 10 logarithm of N.

If the target is moving, the reflected signal is Doppler shifted along the frequency axis and the matched filter doesn't respond to it. To receive a Doppler shifted signal, a bank of matched filters can be used in which each filter is matched to the particular Doppler frequency shifted signal of interest.

This matched filter response to Doppler shifted signals is useful in radar applications because it removes stationary (non-moving) clutter and allows the signals from multiple targets at the same range to be separated. By using binary phase coded signals and a bank of Doppler shifted matched filters, reflected signals from targets with different radial velocities will appear on separate matched filter outputs.

FIG. 2 is a conceptual block diagram of a radar system using Doppler processing. The output signal from an antenna 245 in transmitter/receiver 10 is amplified and bandpass filtered in receiver 247 to remove extraneous noise outside the transmitter 248 signal's bandwidth. A hybrid coupler (power splitter or directional coupler) 255, to separate the transmitted and received signals, is illustrated in FIG. 2 to allow a single antenna to be used for both transmitting and receiving. However, separate receiving and transmitting antennas can also be used.

The analog signal from the receiver is digitized using the analog-to-digital converter (ADC) 260 and processed by a bank of digital matched filters (MF) 265 in signal detection processor 270. Each filter in the bank is matched to a different Doppler shifted version of the transmitted signal. As is well known to those skilled in the art, the filter in the bank that is most closely matched to the Doppler shifted signal will have the largest output for that signal. Therefore, targets at the same range, but moving at different radial velocities, will appear as separate signals because they will each appear at the output of a different matched filter.

Signal detector 271 determines which signals represent moving targets and passes the range, amplitude, and velocity parameters of each target to a target processor 275 to detect and display the targets.

Figure 3:
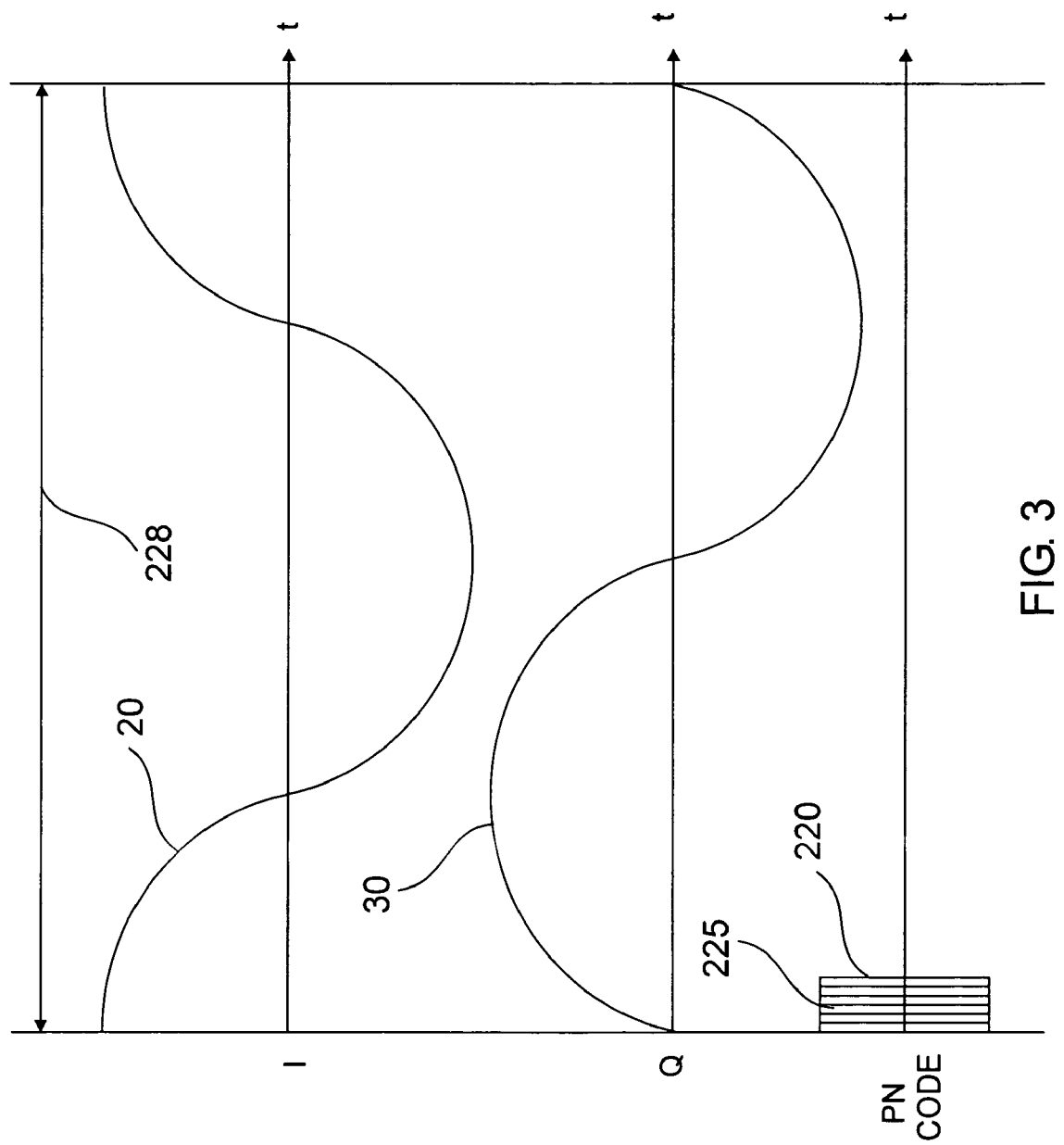
FIG. 3 illustrates a pulsed PN coded signal whose duration is short with respect to the period of the demodulated baseband in-phase (I) and quadrature-phase (Q) signals that would be output by the radar receiver when receiving a CW unmodulated radar signal, from a Doppler shifted target.

FIG. 3 illustrates the demodulated baseband in-phase (I) signal 20 and quadrature-phase (Q) signal 30 that would be output by the radar receiver, when receiving a CW unmodulated carrier radar signal, from a Doppler shifted target. If the target radial velocity was moving at the rate of ½ radar carrier wavelength per second, the illustrated Doppler period 228 would be 1 second. Also illustrated is the assumed width of a short PN phase coded signal 220 that will be used to modulate the CW carrier radar signal.

Referring to FIG. 4, when the PN phase coded signal 220 modulates the transmitter CW carrier and its reflected signal is received from a non-moving target, the demodulated phase coded signal 300 from the receiver is a baseband replica of the transmitted phase coded signal 220. Decoding this signal in a matched filter is equivalent to multiplying the baseband received phase coded signal 300 by a baseband stored replica signal 305 of the transmitted phase coded signal 220 and integrating the output of the multiplier 310 over the duration of the phase coded signal 220 using integrator 315.

For a stationary target, the in-phase and quadrature-phase output components of the multiplier's 310 complex output are constant and related in sine-cosine value depending on the static phase relationship between the baseband received phase coded signal 300 and the baseband stored replica signal 305 as is well known to those skilled in the art. Therefore, the integrated output of integrator 315 over the duration of the pulsed phase coded signal 220 is maximum as indicated by the peak of the ambiguity function 240.

However, if the target is moving, the in-phase and quadrature-phase components of the multiplier's 310 complex output are not constant. This is due to the fact that the phase of the baseband received phase coded signal 300 rotates at the Doppler rate while the phase of the baseband stored replica signal 305 remains constant. When these two signals are multiplied, the phase of the multiplier's 310 complex output varies in the same manner as the I signal 20 and Q signal 30 components illustrated in FIG. 3 under the same Doppler conditions. Therefore, the integrated output of integrator 315 over the duration of the phase coded signal 220 is less than maximum as indicated by the value of the ambiguity function 240 at the target's Doppler offset frequency.

Figure 5:
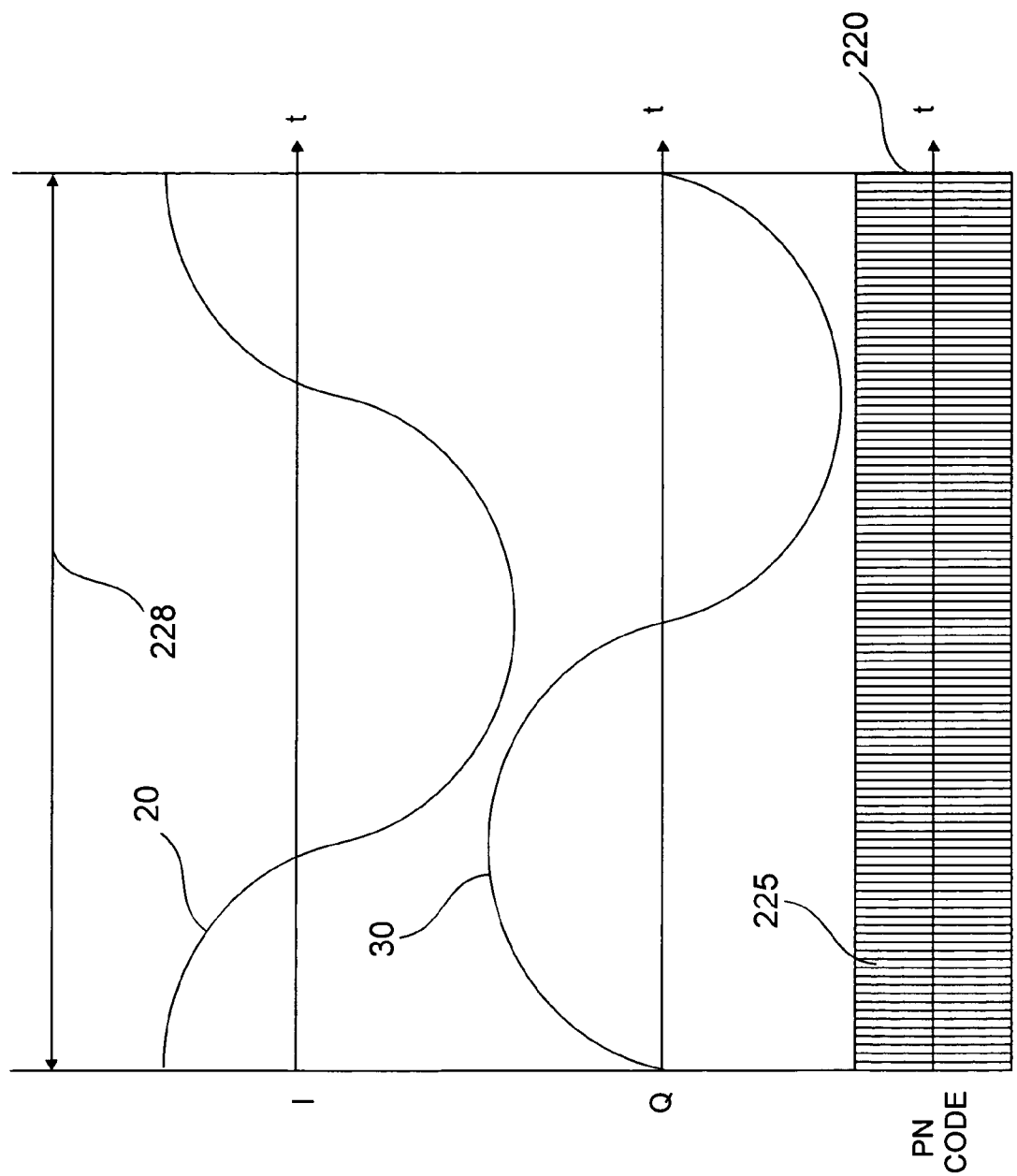
FIG. 5 illustrates a pulsed PN coded signal whose duration is equal to the period of the demodulated baseband in-phase (I) and quadrature-phase (Q) signals that would be output by the radar receiver when receiving a CW unmodulated radar signal, from a Doppler shifted target.

FIG. 5 illustrates the situation when the width of the PN phase coded signal 220 is equal to the period of the Doppler shifted signal. In this situation, the phase of the multiplier's 310 complex output produces a complete sine wave over the duration and integration period of the phase coded signal 220 so their integrated outputs are both zero. This point defines the first Doppler null of the ambiguity function and the Doppler resolution of the radar. That is, it defines the target velocity required to completely separate a moving target from the stationary clutter. In a radar intrusion detection application, the goal is to make this velocity as small as possible so as to detect slow moving (crawling) targets.

As the Doppler frequency increases further, the matched filter output is defined by the low pedestal of the ambiguity function. Thus, the Doppler resolution can be set by the width (duration) of the PN phase coded signal 220 along with the transmit carrier frequency.

The range resolution of the PN phase coded radar is defined by the range width of the PN code chip 225 duration. The range resolution is given by cT/2 where T is the code chip duration and c is the speed of light. The range resolution for a 4 nanosecond code chip duration is approximately 2 feet.

The processing gain of the PN phase coded radar is defined by the integrated number of PN code chips 225. A 30 dB processing gain is obtained by integrating 1000 code chips.

The Doppler shift of a moving target is given by $2V/\lambda$ where $\lambda$ is the wavelength of the radar carrier frequency and V is the radial velocity of the target in wavelengths per second.

Using conventional radar hardware techniques, it is difficult to achieve both high range resolution and high Doppler resolution using a PN coded radar. If a Doppler resolution is required to separate a target with a radial velocity of 1 foot per second from stationary clutter, a PN phase coded signal 220 duration of about 53 milliseconds at 9.3 GHz or 14 milliseconds at 35 GHz is required to equal the duration of the Doppler period 228. If a 2 foot range resolution is also desired, then the PN code chip 225 duration must be about 4 nanoseconds. These requirements result in a PN phase coded signal 220 length of over 13 million code chips at 9.3 GHz and 3.5 million code chips at 35 GHz. The processing resources to Doppler process such long phase coded signals are excessive for many applications.

FIG. 6 illustrates a solution to this problem. In FIG. 6, a PN phase coded signal 220 of the desired length is broken up into a number of smaller segments and spread over the desired Doppler period 228 duration. The length in code chips of the PN phase coded signal 220 is equal to the number of PN code chips 225 required to give the desired processing gain. Each matched filter 265 in the bank of matched filters are matched to the segmented code at different Doppler offset frequencies.

FIG. 6 illustrates the desired PN code length being split into the 4 segments 330, 331, 332, and 333. The number of segments 330-333 is not a critical feature of the present invention, and in most applications many more segments than four will be included in each PN phase coded signal 220. PN Phase coded signal 220 exhibits a magnitude of substantially zero in inter-segment regions 334 between segments 330-333.

Over the Doppler period 228, segments 330 and 332 will cancel in integrator 315 because their in-phase and quadrature-phase components are equal and out of phase. Likewise, components 331 and 333 cancel since their in-phase and quadrature-phase components are also equal and out of phase. Therefore, the Doppler resolution of the radar system can be increased by segmenting and spreading out a desired length PN phase coded signal 220. Without spreading, the Doppler resolution is reduced because a much higher target velocity is required to produce a Doppler period equal to the duration of the shorter duration unsegmented phase coded signal 220.

As an example, if a gain of 40 dB were desired, a code of 10,000 chips would be used. If a Doppler resolution of 1 foot per second were desired at 9.3 GHz, the code segments would be spread over a 53 millisecond duration. If a range resolution of 2 feet were desired, a chip duration of 4 nanoseconds would be selected. Therefore, a 40 microsecond code duration would be spread over a 53 millisecond period. The number of segments used is not critical as long as the segments are distributed such that their integrated output is zero over the desired Doppler period 228 duration.

Thus, the present invention provides, among other things, a method for independently selecting the range resolution, Doppler resolution, and processing gain of a PN coded radar.

Segmenting the PN code also allows a second segmented PN code to be used and interleaved during the time 334 between segments of the original PN code as illustrated in FIG. 7. For example, low resolution code segments 340 (greater code chip 225 duration) could be interleaved with high resolution code segments 335 (smaller code chip 225 duration) to provide a dual resolution radar. The code segments 335 and 340 for each of the high-resolution and low-resolution phase coded signals 220 are placed in the inter-segment regions 334 of the other one of phase coded signals 220. If multiple different phase coded signals 220 are transmitted, additional banks 267 of matched filters are implemented as illustrated in FIG. 2. Each bank is matched to one of the multiple phase coded signals.

With a lower resolution, the spacing between the radar range rings illustrated in FIG. 1 of U.S. Pat. No. 6,922,145 would be larger resulting in a coarser grid pattern. A coarser grid pattern means fewer grid locations need to be processed which requires less processing resources.

In some intrusion detection applications, it may be required to provide high range resolution along the perimeter of a surveillance area to detect human intruders and low range resolution inside the protected area to detect and track larger vehicle traffic. Interleaving high and low resolution segmented PN phase coded signals would save processing resources and lead to a more economical radar.

As is well known by those skilled in the art, the desired detection sensitivity, range resolution, tracking performance, and target identification accuracy can be varied over a wide range of values by the proper selection of carrier frequency, modulation bandwidth, signal power, PN code length, and antenna beam widths. Each particular application will involve selections and tradeoffs between these parameters to optimize performance and minimize overall system cost as is well known by any practicing radar engineer.

The method and preferred embodiments of the invention have been illustrated and described in detail. However, it will be readily apparent to those skilled in the art that various modifications may be made therein without departing from the spirit of the invention.

For example, instead of implementing a bank of individually tuned match filters, Fast Fourier Transform (FFT) processing can also be used to implement the bank of matched filters. Also, the segmenting and interleaving of PN phase coded signals is completely general. Many more than the 2 segmented codes illustrated in FIG. 7 could be used.

What is claimed is:

1. A method for independently setting range resolution, Doppler resolution, and pulse compression processing gain in a pseudo-random coded Doppler radar comprising:
   generating a pseudo-random code (PRC);
   generating a segmented PRC by dividing said PRC into a plurality of PRC sequences;
   generating a spread segmented PRC by spreading the said PRC sequences of said segmented PRC apart in time;
   transmitting said spread segmented PRC into a surveillance area;
   receiving a target signal comprised of reflections from radar targets in said surveillance area due to said transmitting of said spread segmented PRC;
   generating a bank of matched filter outputs by passing said target signal through a plurality of filters where each filter is matched to a different Doppler shifted version of said spread segmented PRC; and
   detecting moving targets in said surveillance area from said bank of matched filter outputs.

2. A method as claimed in claim 1 wherein the number of code chips in said PRC is based on a desired pulse compression processing gain.

3. A method as claimed in claim 1 wherein the code chip duration of said PRC is based on a desired radar range resolution.

4. A method as claimed in claim 1 wherein the duration of the spread segmented PRC is based on a desired Doppler resolution.

5. A method as claimed in claim 1 wherein said transmitting is performed by modulation of a CW carrier.

6. A method as claimed in claim 1 wherein said transmitting is performed by bi-phase modulating a CW carrier using said spread segmented PRC.

7. A method as claimed in claim 1 wherein said bank of matched filter outputs is implemented using FFT processing.

8. A method for simultaneously providing multiple range resolutions in a pseudo-random coded Doppler radar comprising:
   generating multiple pseudo-random codes (PRCs) in which each PRC uses a different code and code chip duration;
   generating multiple segmented PRCs by dividing each of the said multiple PRCs into a plurality of segmented PRC sequences;
   generating multiple spread segmented PRCs by spreading the said segmented PRC sequences of each of the said multiple segmented PRCs apart in time;
   generating a combined spread segmented PRC by interleaving the said segmented PRC sequences of all the said multiple spread segmented PRCs;
   transmitting said combined spread segmented PRC into a surveillance area;
   receiving a combined target signal comprised of reflections from radar targets in said surveillance area due to said transmitting of said combined spread segmented PRC;
   generating multiple banks of matched filter outputs by passing said combined target signal through a plurality of filter banks in which each filter of each filter bank is matched to a different Doppler shifted version of one of said spread segmented PRC in the group of said multiple spread segment PRCs;

detecting moving targets in different resolution areas of said surveillance area from each bank of matched filter outputs in said multiple banks of matched filter outputs.

9. A method as claimed in claim 8 wherein the number of multiple PRCs is two.

10. A method as claimed in claim 8 wherein the number of code chips in each PRC of said PRCs is based on a desired pulse compression processing gain for that PRC.

11. A method as claimed in claim 8 wherein the code chip duration of each PRC of said multiple PRCs is based on a desired radar range resolution for that PRC.

12. A method as claimed in claim 8 wherein the duration of the said combined spread segmented PRC is based on a desired Doppler resolution.

13. A method as claimed in claim 8 wherein said transmitting is performed by modulation of a CW carrier.

14. A method as claimed in claim 8 wherein said transmitting is performed by bi-phase modulating a CW carrier using said combined spread segmented PRC.

15. A method as claimed in claim 8 wherein each bank of matched filter outputs of said multiple banks of matched filter outputs is implemented using FFT processing.

16. A method for operating a radar system comprising:
   identifying a Doppler period, a processing gain, and a range resolution for said radar system;
   defining a pseudo-random code (PRC) having a code chip duration determined in response to said range resolution and a number of code chips determined in response to said processing gain;
   generating a spread segmented PRC by distributing portions of said PRC throughout said Doppler period;
   transmitting said spread segmented PRC into a surveillance area;
   receiving a target signal comprised of reflections from radar targets in said surveillance area due to said transmitting of said spread segmented PRC; and
   processing said target signal in a radar signal processor.

17. A method as claimed in claim 16 wherein said processing activity comprises passing said target signal through a matched filter, said filter being matched to said spread segmented PRC.

18. A method as claimed in claim 17 wherein said processing activity comprises passing said target signal through a plurality of matched filters, where each of said filters is matched to a different Doppler shifted version of said spread segmented PRC.

19. A method as claimed in claim 16 wherein:
   said range resolution is a first range resolution, said PRC is a first PRC, said spread segmented PRC is a first spread segmented PRC, and said first spread segmented PRC is characterized by segments of first code chips spread apart in time by inter-segment regions;
   said identifying activity identifies a second range resolution for said radar system;
   said defining activity defines a second PRC having a code chip duration determined in response to said second range resolution;
   said generating activity generates a second spread segmented PRC by distributing portions of said second PRC throughout said Doppler period, said second spread segmented PRC being characterized by segments of second code chips spread apart in time by inter-segment regions;
   said generating activity also interleaves said first and second PRCs so that said segments of said first code chips reside in inter-segment regions for said second PRC and second code chips for said second PRC reside in said inter-segment regions for said first PRC; and
   said first code chips exhibit a greater duration than said second code chips.

\* \* \* \* \*